United States Patent
Doerr et al.

[19]

[11] Patent Number: 5,809,184
[45] Date of Patent: Sep. 15, 1998

[54] POLARIZATION DIVERSITY WAVEGUIDE GRATING RECEIVER

[76] Inventors: Christopher Richard Doerr, 1000 Oaks Dr., Apt. 99, Atlantic Highlands, N.J. 07716; Martin Zirngibl, Hunterspointe 30, Holmdel, N.J. 07734

[21] Appl. No.: 730,284

[22] Filed: Oct. 15, 1996

[51] Int. Cl.$^6$ .................................................. G02B 6/00
[52] U.S. Cl. ............................. 385/11; 385/24; 385/37; 385/15; 359/114; 359/122; 359/189
[58] Field of Search .................................. 385/11, 24, 37, 385/14, 15; 359/114, 115, 122, 130, 189

[56] References Cited

U.S. PATENT DOCUMENTS 5,127,066   6/1992   Poggiolini .................................. 385/24

OTHER PUBLICATIONS

Polarisation Compensated Waveguide Grating Router on InP, M. Zirngibl, et al, Electronics Letters, 14 Sep., 1995, vol. 31 No. 1, pp. 1662–1664.

Polarization Independent Coherent Optical Receiver, B. Glance, Journal of Lightwave Technology, IEEE, vol. LT–5, No. 2, Feb., 1987.

InP–Based 2.5 Gbit/s Optically Preamplified WDM Receiver, R. Schimpe, et al, Electronic Letters, 6 Jun., 1996, vol. 32, No. 12, pp. 1141–1142.

Low–Loss Phased–Array Based 4–Channel Wavelength Demultiplexer Integrated with Photo Detectors, M.R. Amersfoort, et al., IEEE Photonics Technology Letters, vol. 6, No. 1, Jan. 1994, pp. 62–64.

WDM Receiver by Monolithic Integration of an Optical Preamplifier, Waveguide Grating Router and Photodiode Arrary, M. Zirngibl, et al, Electronic Letters, 30 Mar., 1995, vol. 31, No. 7, pp. 581–582.

Arrayed–Waveguide Grating Add–Drop Multiplexer with Loop–Back Optical Paths, Y. Tachikawa, et al, Electronics Letters 25, Nov. 1993, vol. 29, No. 24 pp. 2133–2134.

*Primary Examiner*—Phan T. H. Palmer

[57] ABSTRACT

A waveguide grating multifrequency receiver (MFR) is described with low polarization sensitivity. Polarization insensitivity is achieved using our polarization diversity scheme in which the TM polarized signal component of the unpolarized received input signal is converted to a second TE polarized signal and both TE polarized signals are made to share a common waveguide grating router and photodetectors. The MFR may be implemented using integrated optical preamplifiers and detectors in indium phosphide (InP).

14 Claims, 5 Drawing Sheets

5,809,184

POLARIZATION DIVERSITY WAVEGUIDE GRATING RECEIVER

TECHNICAL FIELD

The invention relates to a multifrequency lightwave signal receiver and more particularly to a multifrequency lightwave signal receiver implemented to process a received signal of unknown polarization by converting the TM polarized signal thereof into a TE polarized signal and then using a modified receiver to demultiplex both the original and the newly-converted TE polarized signals.

BACKGROUND OF THE INVENTION

There have been several proposals for an integrated Indium Phosphide (InP) based, polarization-insensitive multifrequency lightwave signal receiver (MFR) of the type shown in FIG. 1. Illustrative proposals are describe in the following articles:

(1) "A WDM Receiver Photonic Integrated Circuit With Net On-Chip Gain," IEEE Photon. Tech.Lett., vol. 6, pp. 960–962 (1994) by J. M. Verdiell et al;

(2) "WDM receiver by monolithic integration of an optical preamplifier, waveguide grating router and photodiode array," Electron.Lett., vol. 31, pp. 581–582 (1995) by M. Zirngibl et al; and (3) "InP-based 2.5 Gbit/s optically preamplified WDM receiver," Electron.Lett., vol. 32, pp. 1141–1142 (1996) by R. Schimpe et al..

The advantages of such an integration are high responsivity, strong temperature tunability, compactness, and ease of production. These advantages are especially valuable to upstream wavelength-division-multiplexed local access applications. However, it is difficult to make an integrated MFR polarization insensitive. One extreme approach is to make the amplifier, demultiplexer, and photodetectors all polarization insensitive. There have been reports of polarization-insensitive demultiplexers in InP ( e.g., see "Polarisation-independent phased-array demultiplexer on InP with high fabrication tolerance," Electron.Lett., vol 31., pp.1372–1373 (1995) by H. Bissessur et al; and"Polarisation compensated waveguide grating router on InP," Electron.Lett., vol. 31, pp. 1662–1664 (1995) by M. Zirngibl et al) and with integrated photodetectors with channel spacings of at least 200 Ghz ( e.g., see "Polarisation-independent monolithic eight-channel 2 nm spacing WDM detector based on compact arrayed waveguide demultiplexer," Electron.Lett., vol. 31, pp. 1289–1290 (1995) by J. B. D. Soole et al). However, as the channel spacing of multifrequency systems decreases, polarization insensitivity on InP becomes much more difficult.

Also, L. F. Tiemeijer et al in their article "Polarization insensitive multiple quantum well laser amplifiers for the 1300 nm window," AppL. Phys. Lett., vol. 62, pp. 826–828 (1993).describes polarization-insensitive semiconductor amplifiers. However, compromises must be made in order to integrate polarization-insensitive amplifiers and demultiplexers. The above-identified R. Schimpe et al article reports such a device, but the channel bandwidth was over 1000 GHz. The other extreme approach is to use a polarization diversity scheme ( e.g., see article (2) above and the article "Polarization Independent Coherent Optical Receiver," J. Lightwave Tech., vol. LT-5, pp. 274–276 (1987) by B. Glance) in which the input is split into two orthogonal polarizations, each sent to a separate MFR.

Notwithstanding the progress made by prior art techniques, there is still a continuing need for further improving the design of polarization-insensitive multifrequency lightwave signal receivers (MFRs)

SUMMARY OF THE INVENTION

In accordance with the present invention, a waveguide grating multifrequency receiver (MFR) is described with low polarization sensitivity. Polarization insensitivity is achieved using our polarization diversity scheme in which the TM polarized signal component of the unpolarized received input signal is converted to a second TE polarized signal and both TE polarized signals are made to share a common waveguide grating router and photodetectors.

More particularly, a receiver comprises a polarization splitter for receiving an unpolarized multiplexed lightwave signal and splitting it into a first (e.g., TE) and second ( e.g., TM) orthogonally polarized lightwave signals. A polarization changing means changes the second polarized signal to an additional first polarized signal. A bidirectional wavelength separation filter receives the first polarized signal at a first end and separates it into a plurality N of lightwave signals for output at a second end and also receives the additional first polarized signal at the second end and separates it into a plurality of lightwave signals for output at the first end. A plurality of wavelength detectors detect different wavelengths of both the first polarized signal outputted at the second end and the additional first polarized signal outputted at the first end.

In accordance with another embodiment of the invention, a splitter or a coupler may be used instead of the polarizing splitter. In such an arrangement, the received signal is split into a first and second unpolarized signals and the polarization changing means changes the second signal into an additional first signal by rotating the polarization of the second signal 90 degrees to a polarization of the first signal.

According to one feature of the invention, the receiver may be implemented using optical preamplifiers and detectors integrated in indium phosphide (InP).

BRIEF DESCRIPTION OF THE DRAWINGS

In the drawings:

FIG. 5 shows plots of measured net responsivity [(current in photodetector due to signal)/(signal power in input fiber) ]vs. amplifier drive current for channel 7 from the left side and channel 3 from the right side (the channels with the highest responsivities). The hollow symbols represent when only one amplifier is on, and the solid symbols represent when both amplifiers are on.

DETAILED DESCRIPTION

Figure 1:
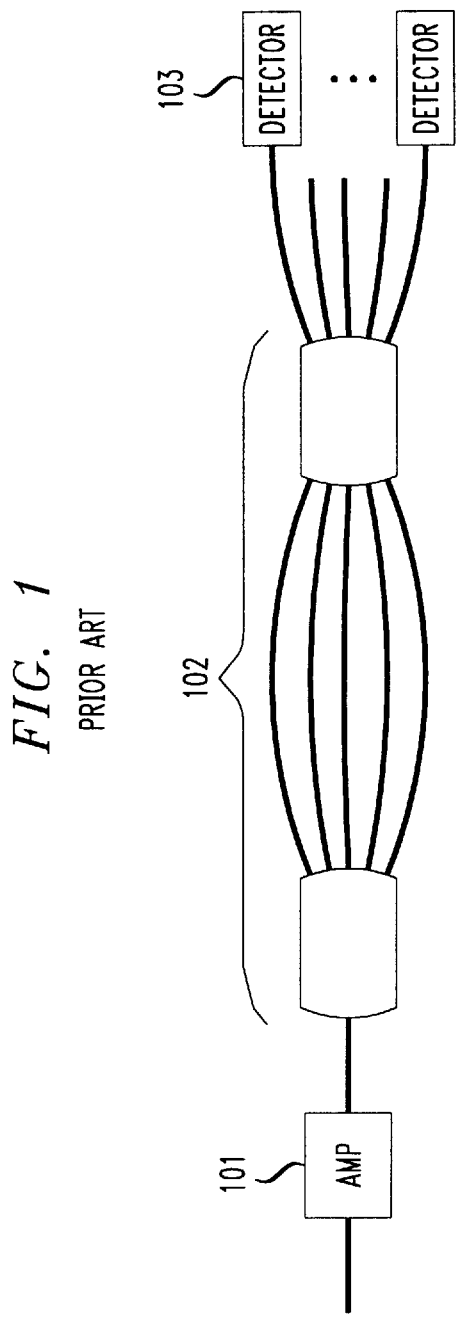
FIG. 1 shows an illustrative prior art multifrequency lightwave signal receiver (MFR)

Shown in FIG. 1, is an illustrative prior art polarization-insensitive multifrequency receiver (MFR) including an optical amplifier 101, a wavelength grating router 102 (e.g., of the type described in U.S. Pat. No. 5,136,671, issued to C. Dragone on Aug. 4, 1992) and a plurality of optical detectors 103. As previously described, making the amplifier 101 and wavelength grating router 102 both polarization-insensitive for small-wavelength-separation multifrequency signals is difficult.

Figure 2:
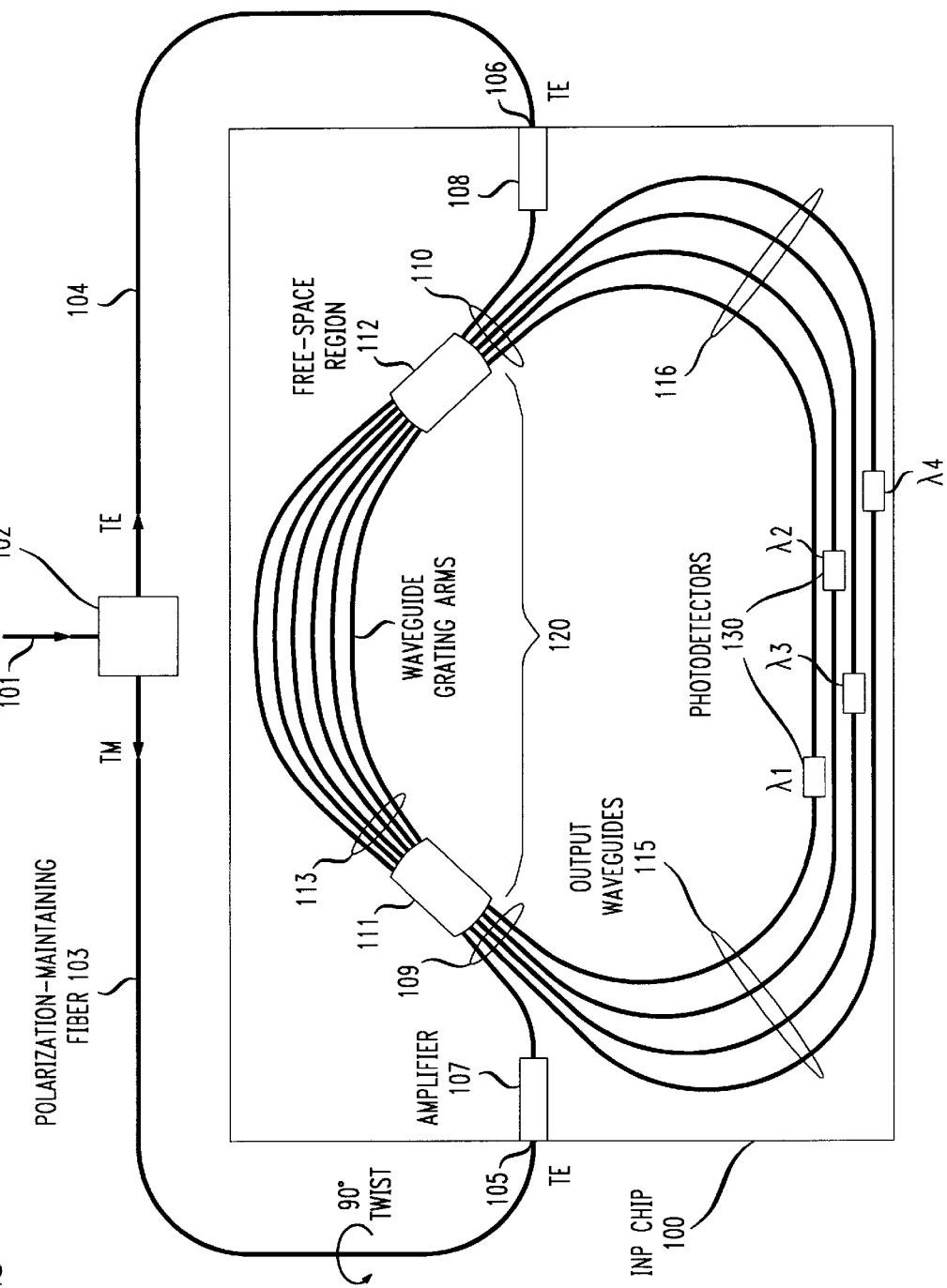
FIG. 2 shows a polarization-insensitive multifrequency lightwave signal receiver (MFR) in accordance with the present invention.

With reference to FIG. 2, we describe the operation of an illustrative MFR implemented in accordance with the present invention. In comparison to the MFR of FIG. 1, our inventive MFR of FIG. 2 only requires that all of its components operate on one type of polarized lightwave signal (TE), but requires a polarization splitter 202, two sided operation of the waveguide grating router 210 and may require two amplifiers 207 and 208.

The MFR is implemented to process an unpolarized multiplexed (N wavelength channels) lightwave signal 201 by converting its TM polarized signal component into a second TE polarized signal component and then using a modified receiver to process both the original and the second TE polarized signals. The MFR includes a polarization splitter 202 for splitting the incoming lightwave 201 into two orthogonally polarized lightwaves, namely, transverse magnetic (TM) and transverse electric (TE). The polarization splitter 202 outputs the TM and TE polarized lightwave signals over polarization-maintaining fibers 203 and 204, respectively, to the circuit chip 200. The polarization-maintaining fiber 204 connects to port 206 so as to maintain a TE polarized signal into port 206. The polarization-maintaining fiber 204, however, includes a 90 degree twist prior to its connection to port 205, polarization thereby changing the TM polarized signal to another TE polarized signal which is inputted to port 205.

As shown in the embodiment of FIG. 2, all of the components of the MFR except for the polarization splitter 202 and the polarization-maintaining fibers 203 and 204 are implemented as part of an indium phosphide (InP) integrated circuit chip 200. Obviously, if desired, the MFR could be implemented using all discrete components.

Amplifiers 207 and 208, while optional, are used when it is necessary to increase the TE polarized signal levels inputted to circuit chip 200. The TE polarized signals ouputted from amplifiers 207 and 208 enter opposite sides of waveguide grating router 220.

The waveguide grating router 220 is, illustratively, a "Dragone" router as described in the above-referenced U.S. Pat. No. 5,136,671, which description is incorporated by reference herein. The waveguide grating router 220 functions as a demultiplexer to separate the TE polarized signal into its N multiplexed wavelength channels. For the following discussion we assume that the N wavelength channels are evenly spaced in frequency. Waveguide grating router 220 includes multiple waveguides 209 which connect to amplifier 207 and to an input at a first end of each of the photodetectors 220. The other end of waveguides 209 connect to free space region (star coupler) 211. The free space region 211 connects through multiple grating arms 213 to a second free space region 212. The free space region (star coupler) 212 connects through multiple waveguides 210 to amplifier 208 and, illustratively, to an input at a second end of each of the photodetectors 220.

In accordance with the operation of waveguide grating router 220, for any multiple wavelength signal received at each of it input waveguides (i.e., 209 or 210), all signal wavelengths which are the same are directed to the same waveguide (of 210 and 209, respectively). Consequently, each of the different wavelengths of TE polarized signal from amplifier 207 is received in free space region 211 and directed, according to wavelength, through a particular one of the waveguides 210 to a connected one of the photodetectors 230. Similarly, each of the different wavelengths of TE polarized signal from amplifier 208 is received in free space region 212 and directed, according to wavelength, through a particular one of the waveguides 209 to a connected one of the photodetectors 230. Thus for the example shown in FIG. 2, since there are 4 waveguides shown connected to photodetectors 230, each TE polarized signal can include up to four wavelength channels $\lambda 1$, $\lambda 2$, $\lambda 3$, and $\lambda 4$ which are then directed to the respective $\lambda 1$, $\lambda 2$, $\lambda 3$, and $\lambda 4$ photodetectors 230. Each of the photodetectors 230 produce a combined electrical signal from the detected lightwave signals received at each of the two inputs.

It should be noted that since the two TE polarized signals travel in opposite directions through waveguide grating router 220 there is no signal interference therebetween. It should also be noted that the waveguides 215 and 216 are symmetrically placed and curve away from the waveguide grating router 220 to reach the same photodetector but from opposite sides. In this way the frequency responses of a detector from each input are identical without interference between the inputs. Also, all of the components on the chip 200 are optimized for just the TE polarization, and all the amplifiers 207 and 208 and photodetectors 230 are on the same crystal axis of the InP. In addition, the photodetectors 230 can be further spread out, increasing electrical isolation and facilitating short connections to electrical transimpedance amplifiers which connect to the electrical outputs (not shown) of photodetectors 220.

Care should be taken to prevent lasing from occurring, e.g., by using antireflective coatings at the fiber 203 and 204 connections to amplifiers 207 and 208. If there are reflections at each input facet, lasing can occur between the facets at a wavelength which, provided that the inputs are in the first Brouillon zone, falls outside of the received channel wavelength range. When lasing occurs, the total gain of the two amplifiers becomes clamped to the total round-trip loss between the two inputs. Unfortunately, gain-compression-induced distortion and crosstalk in the amplifiers is not significantly reduced by this gain clamping since the total gain of the amplifiers is clamped, rather than the gain of each amplifier.

Theoretical Noise Performance

We can view the MFR of FIG. 2 as first having power transmissivity C coupling from the fiber to the amplifier, then frequency-dependent power gain G, and finally frequency-dependent power transmissivity T due to the waveguide grating router. The received signal current power is thus equal to $[eC_0G_0T_0P/(hf_0)]^2$, in which e is the charge of an electron, P is the input power (in the fiber 203 or 204), h is Planck's constant, f is frequency, and the subscript 0 implies the value taken at the signal frequency. Following prior art analysis techniques, if the input signal is narrow-band and in a coherent state and the amplifier is linear, we find that the received noise current power in electrical bandwidth B is $$N = 2Be^2C_0G_0T_0[2n_{sp}(G_0 - 1)T_0 + 1]P/hf_0 + \quad (1)$$

$$4Be^2 \int_0^\infty n_{sp}(G-1)T[n_{sp}(G-1)T+1]df + N_e$$

where $n_{sp}$ is the population inversion parameter, and $N_e$ is the electrical amplifier and dark noise current powers. Eq. (1) is valid provided T and G vary slowly with changes in f on the order of B. An extra factor of two is included in the second term because of the two polarizations (two inputs in our case). The first term contains the signal-spontaneous emission beat and signal shot noises, and the second term contains the spontaneous-spontaneous emission beat and spontaneous emission shot noises.

The second term becomes important when the detected signal power is near to or less than the detected spontaneous emission power. The ideal frequency response for T that minimizes the second term would be a narrow single passband centered at the signal frequency. However, in our MFR the shape of T is determined by the waveguide grating, which consists of a periodic sequence of passbands. The extra passbands can allow extra spontaneous emission to reach the photodetector. If we approximate the spectrum of G as being rectangular, i.e., $G = G_0$ from frequencies $f_1$ to $f_2$ and 0 elsewhere, we can write the second term of Eq. (1) as $$4Be^2 n_{sp}(G_0-1)T_0[n_{sp}(G_0-1)T_0 B_{sp-sp} + B_{sp}]$$

Then $$B_{sp-sp} = \int_{f_1}^{f_2} (T/T_0)^2 df \text{ and } B_{sp} = \int_{f_1}^{f_2} (T/T_0) df$$

which are the effective bandwidths of the spontaneous-spontaneous emission beat and spontaneous emission shot noises reaching the detector, respectively. In the waveguide grating, the main way to decrease $B_{sp}$ is to increase the number of grating arms M. The two main ways to reduce $B_{sp-sp}$, the more important term when $n_{sp} G_0 T_0$ is large, are to increase M or chirp the waveguide grating. Such a technique is described in the article "Chirped waveguide grating router multifrequency laser with absolute wavelength control," to be published in IEEE Photon. Tech. Lett. by C. R. Doerr et al.

Figure 3:
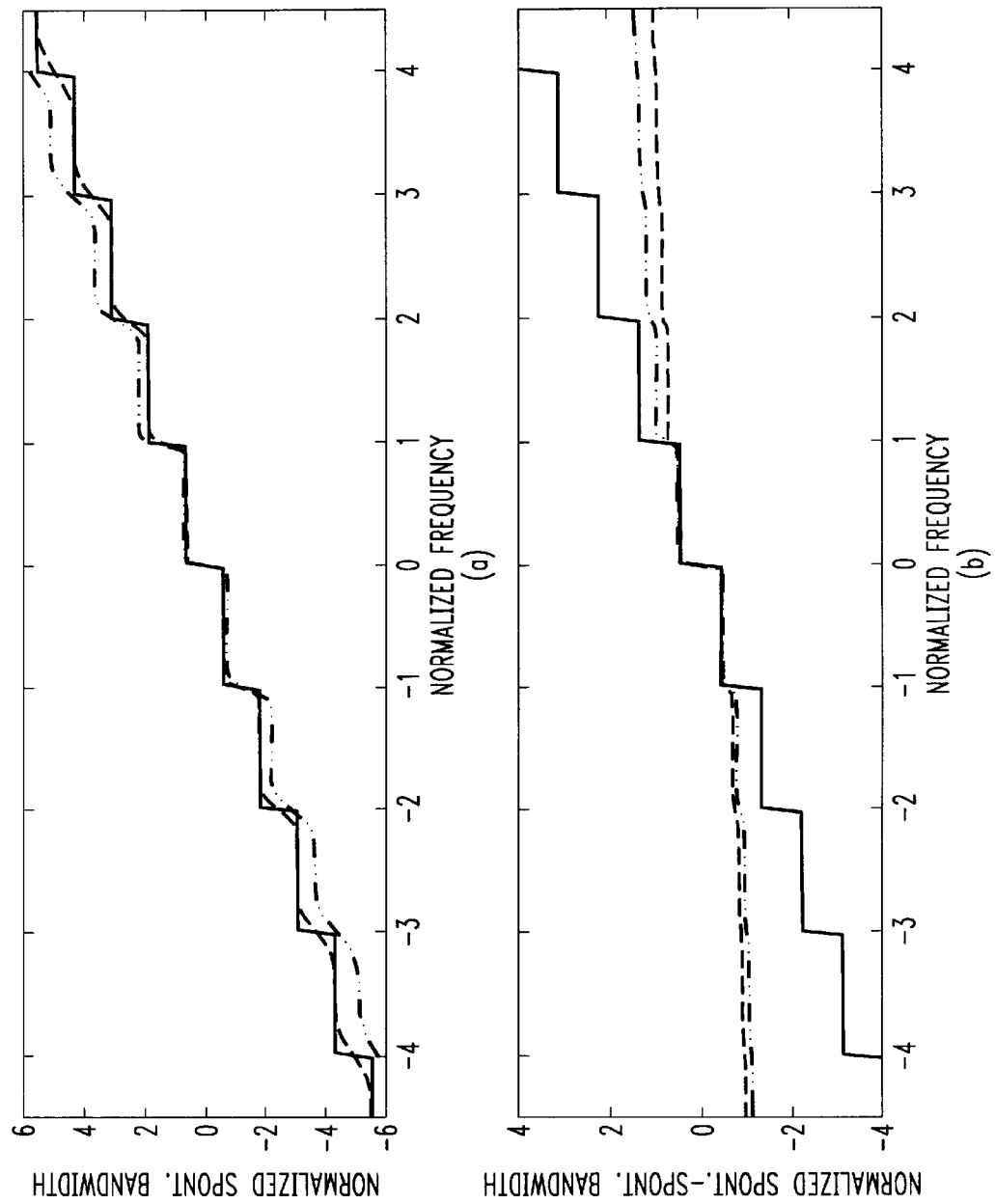
FIGS. 3a and 3b show, respectively, theoretical spontaneous emission shot noise bandwidth and spontaneous-spontaneous emission beat noise versus frequency curves for a M-grating-nonchirped (solid lines) and M-grating-chirped waveguide gratings.

FIGS. 3a and b show $$M \int_{f_0}^{f} (T/T_0) df / \Delta f \text{ and } M \int_{f_0}^{f} (T/T_0)^2 df) / \Delta f \text{ vs. } (f - f_0)/\Delta f,$$

respectively, for nonchirped (solid lines) and M-grating-chirped [$\gamma=1.1$, $(p-q)_c=0$] waveguide gratings with free-spectral range f. For the chirped case, cases for a channel at the center of the chirp envelope (dashed lines) and a quarter of a free-spectral range from the center (dash-dot lines) are shown. The power distribution in the grating arms is a Gaussian that falls to $\exp^{-2}(1)$ of the peak in the outermost arms. M=36. Changing M changes only the sharpness of the bumps on the curves.

One finds that for a conventional nonchirped waveguide grating, $B_{sp} = 1.23\Delta f/M$ ($= \Delta f/M_{eff}$) per passband and $B_{sp-sp} = 0.99 \Delta f/M$ per passband for the arm power distribution described above. For a chirped waveguide grating, $B_{sp}$ per passband is essentially the same as in the nonchirped case, but $B_{sp-sp}$ per passband rapidly becomes negligible at frequencies more than a few free-spectral ranges from the chirp envelope peak.

For example, using the measured parameters of the illustrative MFR described in the next section, if the net responsivity is 3.5 A/W, then at 155 Mb/s the predicted sensitivities for a $10^{-9}$ bit error rate are −42.1 dBm if the waveguide grating is chirped and −40.1 dBm without chirp. Or if the net responsivity is 20 A/W, the predicted sensitivities at 2.5 Gb/s are −34.9 dBm with chirp and −33.2 dBm without chirp. Thus chirping the waveguide grating is useful in cases of low bit rates and/or high net responsivities.

An Example of the Invention

We now describe the results for an illustrative 8-channel MFR designed using the above-described technique. Three quantum wells sit on top of a rib-loaded slab (with a normalized transverse index step of 0.0043) and are etched away everywhere but the amplifiers and photodetectors. Such a structure is highly polarization dependent but gives good active/passive transitions and so is well-suited for the proposed MFR design (FIG. 2). The amplifiers 207 and 208 are 1 mm long, and the detectors 230 are 200 mm long. Both are deep-etched. For TE polarized light, the typical loss of a straight waveguide for this structure is ~2.4 dB/cm and a curved waveguide is ~1.3 dB/rad. For the waveguide grating, M=36, Df=1200 GHz, and channel spacing =100 GHz. The total of 9 ports per side ( 8 channels and 1 for TE input) are centered in the first Brouillon zones. The waveguide grating is chirped using an M-grating design with g=1.1 and (p−q)c=−5. Micromachined fiber lenses couple the fiber to the inputs.

All of the following measurements are from the same chip, which is 7 by 12 mm. We placed the photoluminescence peak of the quantum wells at 1.61 mm, allowing us to have good photodetector efficiency at 1.55 mm while simultaneously achieving a broad gain spectrum centered at 1.55 mm because of bandfilling in the quantum wells. From measured spontaneous emission levels, $n_{sp}$ ~5.7 (noise figure of ~11 dB) for the amplifiers at 1555 nm, and the 3 dB gain bandwidth is ~65 nm at 100 mA. The photodetector efficiencies are estimated to be nearly 100%, and it was found that the photodetectors could be shorter than 100 mm without loss in responsivity. The resistance between photodetectors is 4.5 MΩ.

Figure 4:
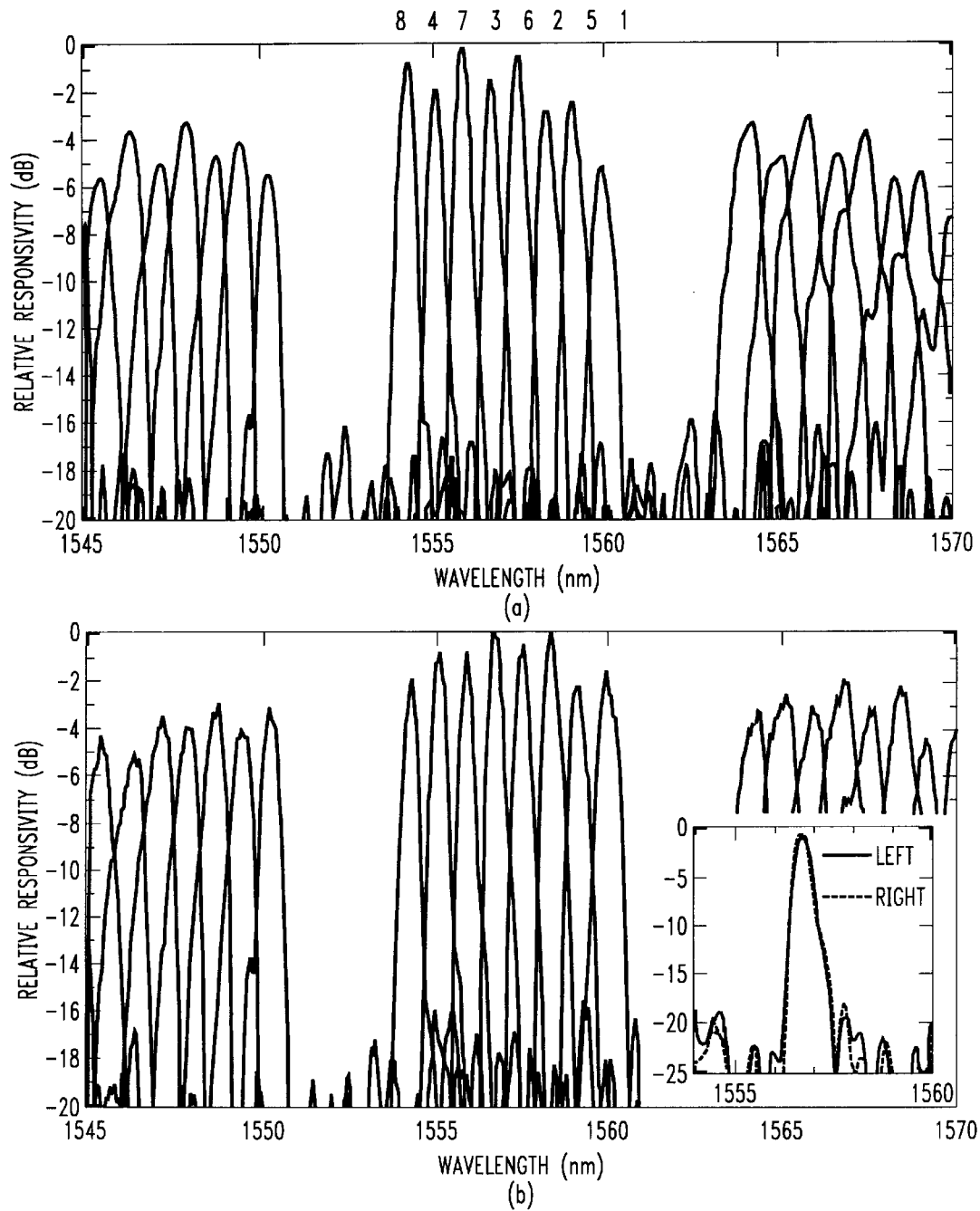
FIGS. 4a and 4b show relative polarization responsivities versus wavelength of an illustrative 8 channel detector for input from the left (a) and the right (b)

Relative responsivity vs. wavelength plots for the eight detectors from the two inputs are shown in FIG. 4a. The relative responsivities of the 8 channels are shown for input from the left (a) and the right (b) as measured with a tunable laser, mechanical chopper, and a lock-in. Amplifier currents were 40 mA each. The channels are numbered from left to right on the chip (FIG. 2). The inset of (b) is an overlay for channel 3 from the left and right inputs. The absolute responsivities have been normalized. Normalized close-ups of the frequency responses of channel 3 from both inputs are overlaid in the inset of FIG. 4b, demonstrating nearly identical frequency responses.

The input amplifier currents can be fine-tuned to make the responsivities from the two inputs for a given channel equal (i.e., make the channel polarization insensitive). As one can see from FIG. 4, the "polarization sensitivities" of channels 3–8 can be simultaneously all less than 1.5 dB, with channels 1 and 2 being 3 dB. The differences between channels in responsivity are most likely due to variations in the output bends and passive/photodetector transitions. The variations should be significantly reduced by improved design and processing.

Figure 5:
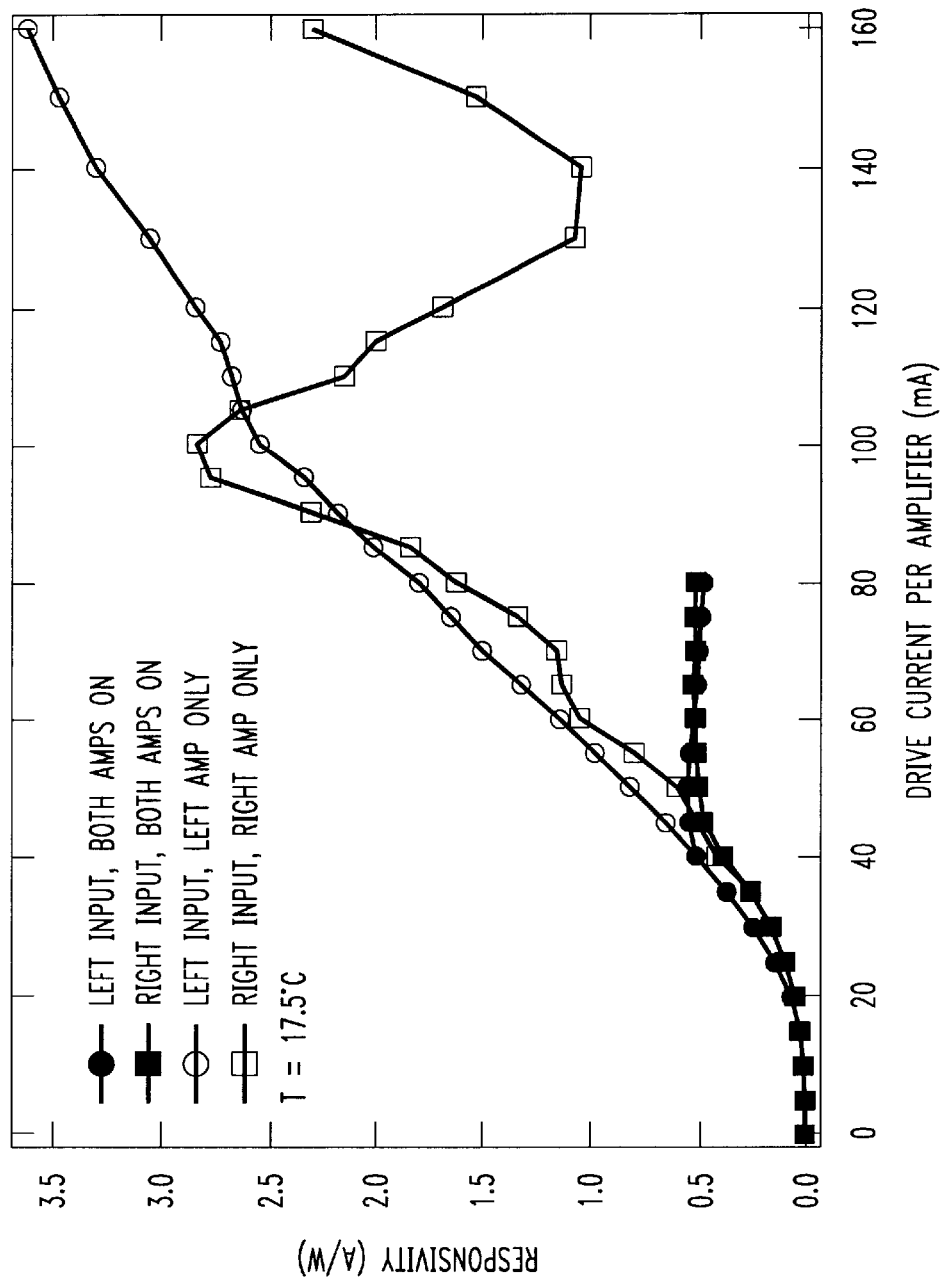

The net responsivities from the left and right inputs for the best channels as a function of amplifier drive currents are shown in FIG. 5. FIG. 5 shows plots of measured net responsivity [(current in photodetector due to signal)/(signal power in input fiber)] vs. amplifier drive current for channel 7 from the left side and channel 3 from the right side (the channels with the highest responsivities). The hollow symbols represent when only one amplifier is on, and the solid symbols represent when both amplifiers are on.

The responsivity is abruptly limited once laser oscillation occurs when both amplifiers 207 and 208 are on. The nonmonotonic shape for the right input in FIG. 5 when only one amplifier is on is caused by gain ripple from reflections between the active-passive interface and the facet on the right side. The fiber-to-chip coupling transmissivities are $C_0=-2.9$ and $-3.0$ dB for the left and right sides, respectively; and the transmissivity through the waveguide grating router 220 is estimated to be $T_0=-12$ dB [$-9$ dB through the waveguide grating ($T^{grat}_0$) and $-3$ dB through the long output bend ($T^{out}_0$)]. Thus when the device is lasing, the single-pass gain of each amplifier is ~11 dB. Because of the lasing, the net responsivity when both amplifiers are on cannot exceed $\sim[e/(hf_0)]C_0 T^{out}_0 \sqrt{T^{grat}_0/R_0}$, where R is the facet power reflectivity. Thus to improve the responsivity, one must increase $T^{out}_0$, increase $T^{grat}_0$, and/or decrease $R_0$. In our case, it should be possible to substantially decrease $R_0$ by improving the AR coatings, for which currently $R_0 \sim 5\%$.

Gain compression in the optical amplifiers 207 and 208 becomes noticeable at powers in the input fiber above ~−10 dBm. Thus the total input power must be kept below −10 dBm, otherwise the MFR becomes polarization dependent.

What has been described is merely illustrative of the present invention. For example, a splitter or a coupler may be used instead of the polarizing splitter 202. In such an arrangement, the received signal is split into a first and second unpolarized signals and the polarization changing means changes the second signal into an additional first signal by rotating the polarization of the second signal 90 degrees to a polarization of the first signal. It should be noted that polarization changing means other than the 90 degree "twisted" fiber may be utilized.

The function of the waveguide grating router 120 may more generally be performed by a bidirectional wavelength separation filter for separating multiple wavelengths from a received multiplexed signal. Additionally the detectors 130 need not have two inputs, rather a single input detector may be used with a coupler or lens to direct the lightwave signals to that input. Obviously if desirable, the TM polarization and the use of other types of semiconductor materials may be utilized. Thus, other arrangements can be implemented by those skilled in the art without departing from the spirit and scope of the present invention.

We claim:

1. A receiver comprising
   a polarization splitter for receiving an unpolarized multiplexed lightwave signal and splitting it into a first and second orthogonally polarized lightwave signals,
   polarization changing means for changing the second polarized signal to an additional first polarized signal,
   a bidirectional wavelength separation filter for receiving the first polarized signal at a first end and separating it into a plurality of separate wavelength channel signals for output at a second end and for receiving the additional first polarized signal at the second end and separating it into a plurality of separate wavelength channel signals for output at the first end, and
   a plurality of detectors, each detector detecting a different wavelength channel signal, wherein each channel in the first polarized signal impinges on one end of a corresponding detector and each channel in the additional first polarized signal impinges on a different end of the same corresponding detector.

2. The receiver of claim 1 wherein the bidirectional wavelength separation filter is a bidirectional waveguide grating router.

3. The receiver of claim 1 wherein the bidirectional wavelength separation filter is a chirped bidirectional waveguide grating router.

4. The receiver of claim 1 wherein the bidirectional wavelength separation filter and the detectors are integrated together onto a semiconductor chip.

5. The receiver of claim 4 wherein the semiconductor chip is made of Indium Phosphide.

6. The receiver of claim 1 wherein a polarization-maintaining optical fiber is used to connect the first polarized signal between the polarization splitter and the bidirectional wavelength separation filter.

7. The receiver of claim 1 wherein the first polarized signal and the additional first polarized signal are TE polarizations.

8. A receiver comprising
   a polarization splitter for receiving an unpolarized multiplexed lightwave signal and splitting it into a first and second orthogonally polarized lightwave signals,
   polarization changing means for chancing the second polarized signal to an additional first polarized signal, wherein the polarization changing means includes a polarization-maintaining optical fiber which has a 90 degree twist, whereby the second polarized signal received from the polarization splitter at a first end of the fiber is outputted to a bidirectional wavelength separation filter at a second end of the fiber as the additional first polarized signal
   said bidirectional wavelength separation filter for receiving the first polarized signal at a first end and separating it into a plurality of separate wavelength channel signals for output at a second end and for receiving the additional first polarized signal at the second end and separating it into a plurality of separate wavelength channel signals for output at the first end, and
   a plurality of detectors, each detector detecting a different wavelength channel signal, of both the plurality of first polarized signal outputted at the second end and the additional first polarized signal outputted at the first end.

9. A receiver comprising
   a polarization splitter for receiving an unpolarized multiplexed lightwave signal and splitting it into a first and second orthogonally polarized lightwave signals, polarization changing means for changing the second polarized signal to an additional first polarized signal,
   a bidirectional wavelength separation filter for receiving the first polarized signal at a first end and separating it into a plurality of separate wavelength channel signals for output at a second end and for receiving the additional first polarized signal at the second end and separating it into a plurality of separate wavelength channel signals for output at the first end,
   a plurality of detectors, each detector detecting a different wavelength channel signal, of both the plurality of first polarized signal outputted at the second end and the additional first polarized signal outputted at the first end,
   a first amplifier, located between the polarization splitter and the bidirectional wavelength separation filter, for receiving, amplifying and outputting the first polarized signal to the first end of the bidirectional wavelength separation filter and a second amplifier, located between the polarization changing means and the bidirectional wavelength separation filter for receiving, amplifying and outputting the additional first polarized signal to the second end of the bidirectional wavelength separation filter.

10. The receiver of claim 9 wherein the first and second amplifiers together with the bidirectional wavelength separation filter and the detectors are integrated together onto a semiconductor chip.

11. The receiver of claim 10 wherein the semiconductor chip is made of Indium Phosphide.

12. A receiver comprising a splitter for receiving an unpolarized multiplexed lightwave signal and splitting it into a first and second lightwave signals, polarization changing means for changing the second signal to an additional first signal by rotating the polarization of the second signal 90 degrees to a polarization of the first signal, a bidirectional wavelength separation filter for receiving the first signal at a first end and separating it into a plurality of separate wavelength channel signals for output at a second end and for receiving the additional first signal at the second end and separating it into a plurality of separate wavelength channel signals for output at the first end, and a plurality of detectors, each detector detecting a different wavelength channel signal wherein each channel in the first polarized signal impinges on one end of a corresponding detector and each channel in the additional first polarized signal impinges on a different end of the same corresponding detector.

13. The receiver of claim 12 wherein the splitter is a polarization splitter.

14. The receiver of claim 12 wherein the splitter is a coupler.

\* \* \* \* \*